Dec. 19 1922.
G. N. BLANCHARD.
AUTOMATICALLY CONTROLLED PRESSURE FEED FOR LIQUID HYDROCARBON BURNERS.
FILED AUG. 9, 1921.
1,439,288
3 SHEETS-SHEET 1
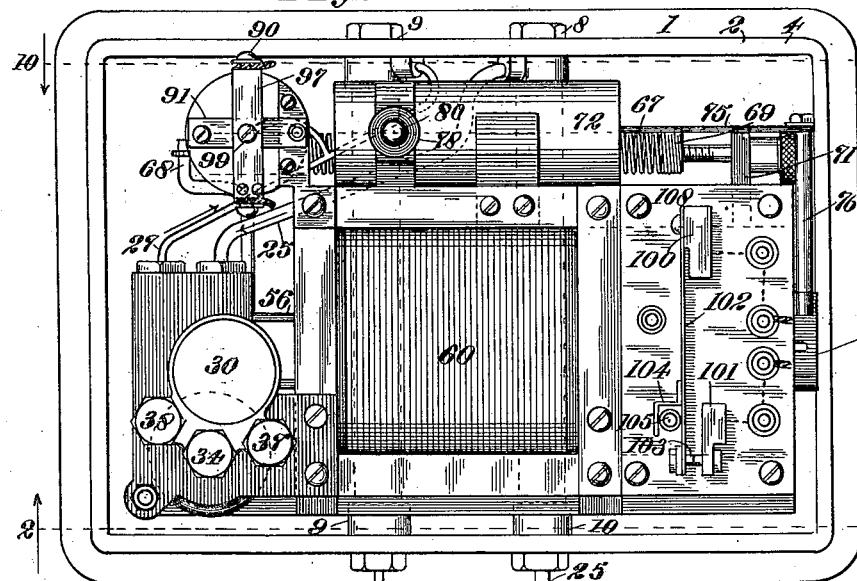
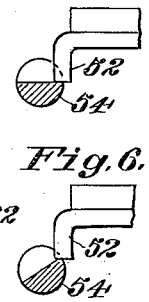
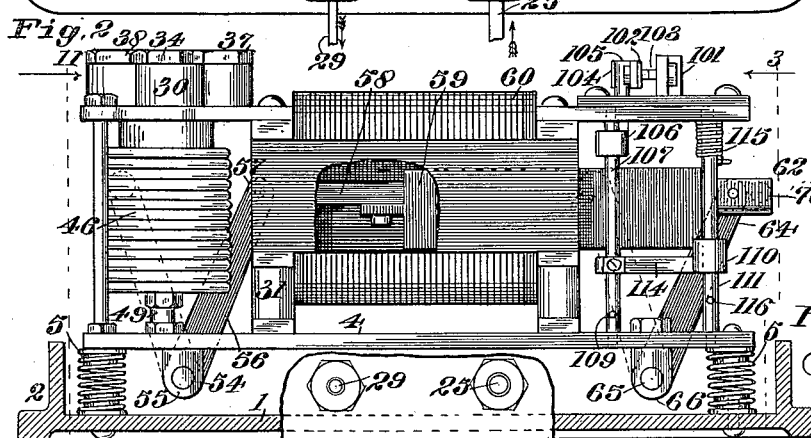
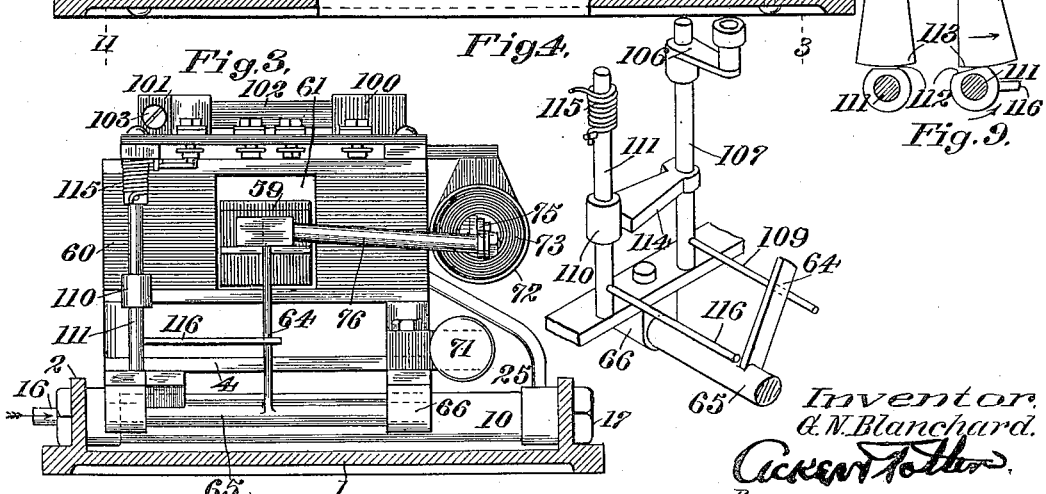
Inventor,
G. N. Blanchard.
By
Attorneys Dec. 19 1922.  
G. N. BLANCHARD.  
AUTOMATICALLY CONTROLLED PRESSURE FEED FOR LIQUID HYDROCARBON BURNERS.  
FILED AUG. 9. 1921.  
1,439,288  
3 SHEETS-SHEET 2
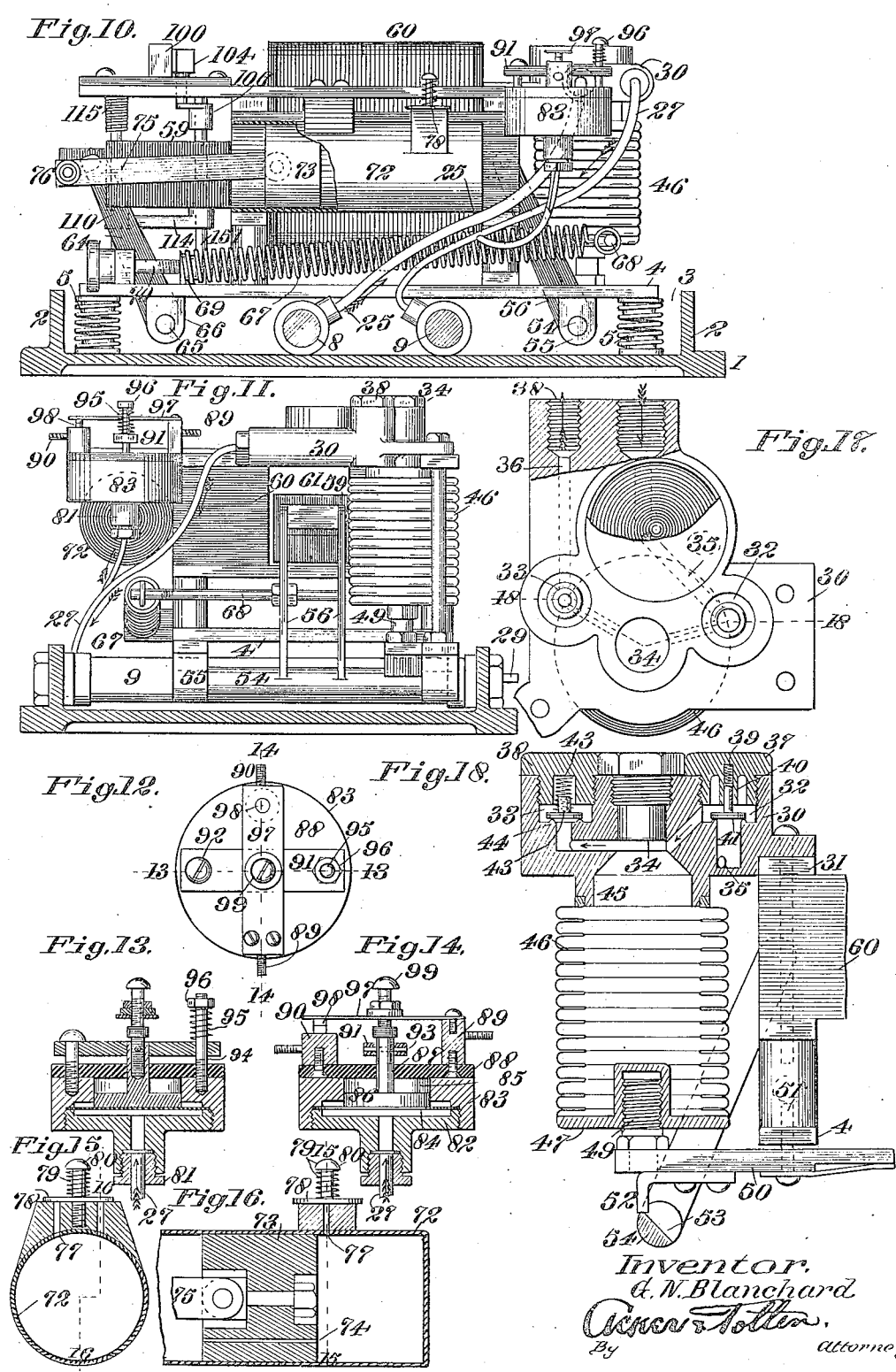

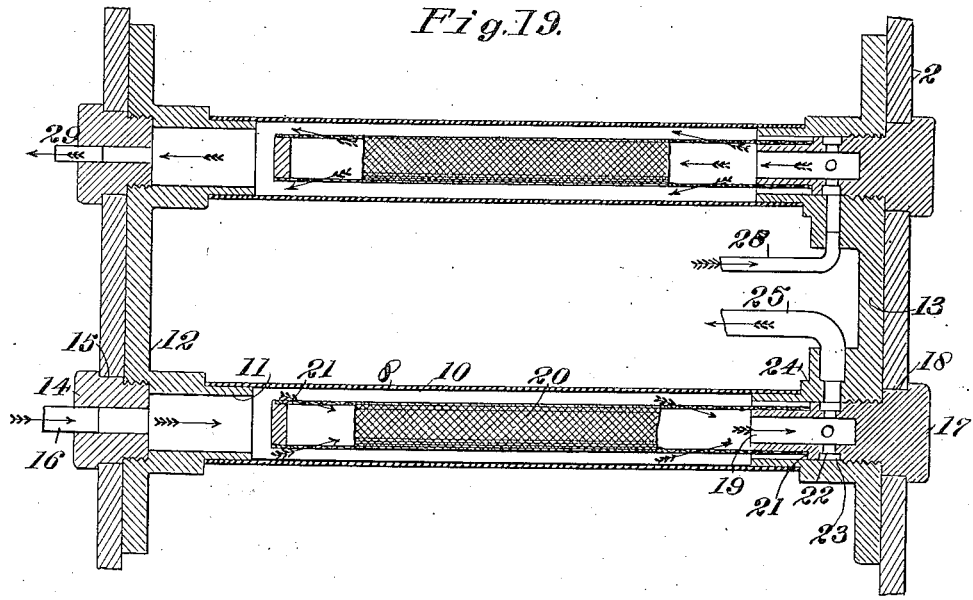

Patented Dec. 19, 1922.

1,439,288

UNITED STATES PATENT OFFICE.

GEORGE N. BLANCHARD, OF OAKLAND, CALIFORNIA, ASSIGNOR TO EDWIN B. KIMBALL, TRUSTEE, OF SAN FRANCISCO, CALIFORNIA.

AUTOMATICALLY-CONTROLLED PRESSURE FEED FOR LIQUID HYDROCARBON BURNERS.

Application filed August 9, 1921. Serial No. 491,059.

*To all whom it may concern:*

Be it known that I, GEORGE N. BLANCHARD, a citizen of the United States, residing at the city of Oakland, in the county of Alameda and State of California, have invented certain new and useful Improvements in Automatically-Controlled Pressure Feed for Liquid Hydrocarbon Burners, of which the following is a specification.

The present invention relates to an apparatus of a type for supplying liquid hydrocarbon fuel to a burner under pressure in accordance with the temperature which is desired to be maintained within a given enclosure.

Among the principal objects of this invention is to provide an apparatus of the electrically operated pump type, the actuating motor of which when in use will require but very little electric energy, and the operation of which controls electric contact devices controlling the pump motor operating circuit.

A further object is to provide a pressure operated electric contact device within the motor circuit, which is operated by a variation in pressure in the fuel feed line, whereby the motor circuit is controlled in accordance with the pressure in the fuel feed line, and a' further object is to provide a thermostatic device within the motor circuit which is controlled by the room temperature, and this in turn also controlling the motor circuit.

Another object is to provide an apparatus which withdraws or raises the hydrocarbon fuel from a receptacle below the burner level and supplies the same at a uniform pressure to the burner.

A further object is to provide an efficient filter for the hydrocarbon fuel by the employment of which foreign substances in the fuel are separated therefrom prior to the fuel entering the burner, thus reducing to a minimum the clogging of the burner by foreign substances in the fuel.

Other objects will appear as the description proceeds, and with the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in top plan of the preferred embodiment of my invention.

Figure 2 is a sectional view taken on line 2—2 of Figure 1 with a portion of the motor casing broken away.

Figure 3 is a vertical end view taken on line 3—3 of Figure 2.

Figure 4 is a view in detailed perspective of the motor actuated device for controlling the motor circuit and the lock therefor.

Figure 5 is a view in detail of the pump operating cam and the lever actuated thereby and associated with the pump.

Figure 6 is a view similar to Figure 5 with the cam illustrated in its raised position.

Figure 7 is a view in detail of the pump lever.

Figure 8 is a view in detailed plan of the locking mechanism for the motor actuated circuit controlling device, the same being in released position.

Figure 9 is a view similar to Figure 8 with the locking mechanism in its locked position.

Figure 10 is a broken sectional view taken on line 10—10 of Figure 1.

Figure 11 is a view in end elevation taken on line 11—11 of Figure 2.

Figure 12 is a view in detailed plan of the pressure actuated circuit controlling means.

Figure 13 is a vertical sectional view taken on line 13—13 of Figure 12.

Figure 14 is a similar view taken on line 14—14 of Figure 12.

Figure 15 is a detail sectional view of the motor speed governor, taken on line 15—15 Figure 16.

Figure 16 is a detail sectional view of the motor speed governor taken on line 16—16 of Figure 15.

Figure 17 is a view in detailed plan of the fuel feed channels and check valves in the head of the fluid pump.

Figure 18 is a vertical sectional view through the pump taken on line 18—18 of Figure 17.

Figure 19 is a longitudinal sectional view through the apparatus disclosing the construction of the filters for the fuel, and Figure 20 is a diagrammatic view of the apparatus.

Referring more particularly to the several views of the drawings, wherein like characters of reference designate corresponding parts, 1 is a suitable supporting plate surrounded by an upstanding annular flange 2, the same forming above said plate an open topped chamber 3 within which is mounted a bed 4. To deaden the sound of the operation of the device, the bed 4 is supported above said plate 1 by suitable coiled springs 5, one being preferably disposed beneath each corner of the bed 4.

The hydrocarbon fuel in its travel from the storage receptacle or container 6 to the burner 7, both illustrated in Figure 20, passes through suitable filters 8 and 9, Figure 19 of the drawings, and which filters are disposed in parallel relation within the chamber 3, and beneath the bed 4, and each consists of a tubular cylinder 10 extending at its opposite ends over the nipples 11 carried by the respective end plates 12 and 13, one of which is positioned adjacent the inner face of opposing members 2 forming opposite sides of the chamber 3. The nipples 11 extend entirely through their respective plates, and that associated with the plate 12 is held in position by a suitable tubular plug 14 threaded into the plate 12 and extending through an opening 15 in its associated wall 2. The fuel feed pipe 16 connects with the aperture in said plug 14, and leads from the fuel storage tank or receptacle 6. The nipple associated with the plate 13 is closed at its outer end by a plug 17 threaded thereinto through an opening 18 in its associated end wall 2, and said plug is provided with a tubular extension 19, over the end of which is fitted a filtering screen 20, tubular in form and closed at its free end by a plug 21. The inner end of this filtering screen abuts against an annular spacing and supporting flange 21 carried by the member 19, and said member 19 in rear of said flange is formed with the fluid discharge ports 22 communicating with the annular channel 23 surrounding said member 19 when discharging through a port 24 in the nipple into a pipe 25. This pipe passes through a pump 26, hereinafter more fully described, and from said pump 26 extends a pipe 27 of a smaller diameter than the pipe 25, and branching from the pipe 27 is a pipe 28 leading into the filter 9, and from the plug 14 of said filter extends a pipe 29 connecting directly with the burner 7. It will be observed that in the filter 8, the material or foreign particles separated from the hydrocarbon fuel collects on the exterior of the screen 20, while, in the filter 9, any additional matter separated collects on the interior of the screen 20, both of which screens are adapted for ready removal and cleaning by the removal of the plugs 17.

As illustrated in Figures 1, 2, 10 and 11 of the drawings, the pump 26 is located at one corner of the bed 4, and is supported thereby, and said pump consists of a top plate 30 secured to a supporting post 31 extending upwardly from the bed 4, and said plate is provided with fuel inlet valve chambers 32 and 33 connected by a channel or passage 34. The chamber 32 is provided with an inlet port 35 through which discharges the pipe 25, and the chamber 33 is provided with a port 36 with which connects the pipe 27, Figure 20 of the drawings. Plugs 37 and 38 close the respective chambers 32 and 33, and each is provided on its under face with a port 39 affording a guide for the stem 40 of the respective check valves 41 and 42 positioned respectively in the chambers 32 and 33. The valves are seated by the conventional coiled springs 43, and when in closed position rest on conventional seats 44. The passage 34 opens into an enlarged chamber 45 to which is secured one end of a tubular syphon or pumping cylinder 46 of the well known expansible accordion type, and the same at its lower end is closed by a base plate attached thereto and threaded to a stud 49 extending upwardly from a supporting member 50 mounted for free vertical movement on a pin 51 carried at the lower end of the post 31. The end of the member 50 at a point below the stud 49 and centrally beneath the cylinder carries a downwardly flanged foot plate 52, the lower edge of the flange of which rests on one edge of an operating cam 53 formed by inwardly cutting the one surface of a cylindrical rod 54, which extends transversely beneath the bed 4, and at its ends is fulcrumed to oscillate in ears 55 depending therefrom. The expansion and contraction of the sylphon 46 causes a suction of fuel into the port 35, and channel 34, filling the sylphon and discharging through the port 36, and the operation of the sylphon through the cam 53 is accomplished by the following mechanism:—

Extending radially from the member 54 adjacent the sylphon 46 is a pair of arms 56 pivotally connected at their upper ends, as at 57, to the outer end of an extension 58 connected at its opposite end to the core 59 of an armature 60, said core being preferably rectangular in cross section and positioned within an open ended rectangular bore 61 disposed longitudinally of said armature. The opposite end of said core 59 carries an extension 62, and the same is pivotally connected, as at 63, with one end of a lever 64 extending upwardly from a rod 65 disposed parallel to rod 54 beneath the bed 4 and rotatably mounted at its ends in ears 66.

The energizing of the solenoid 60 draws the core 59 longitudinally of the channel 61 from the passage illustrated in Figures 2 and 10 of the drawings. On the breaking of the circuit hereinafter described which controls the energizing of the solenoid 60, the core is positively returned to the position in Figures 2 and 10 of the drawings, by the action of a coiled tension spring 67 disposed at one side of the armature and fixed at one end to a rod 68 extending laterally from one of the arms of said pair 56, and said spring at its other end is attached to a nut 69 adjustable on a screw 70, which screw is held from longitudinal movement by and rotatable within a receiving opening in a lug or ear 71 projecting upwardly from the bed 4. Without some sort of controlling means, the reciprocating movements of the core 59 would be rather rapid and terminate abruptly, and to make the operation thereof smooth, I employ a suitable cylinder 72 closed at one end, and disposed parallel with the bore 61. Within the open end of the cylinder is inserted a piston 73 formed with a relatively small by-pass opening 74, and the piston is connected by a link 75 with the outer end of an arm 76 extended laterally from and secured at its inner end to the extension 62. The cylinder 72 at a point adjacent its inner closed end is formed with a vent 77, normally closed against the inward passage of air therethrough by a check valve 78 seated by a spring 79 surrounding a guide pin 80. It will be observed that the speed of the stroke of the piston 73 is controlled by the passage of air through the ports 74 and 77, and thus insures a relatively slow stroke of the core 59 in either direction within the solenoid 60, thereby reducing the wear to the various parts of the apparatus, and rendering the same relatively silent in its operation.

To control the operation of the apparatus in accordance with the pressure in the pipes 27 and 28, I connect the end of the pipe 27 through a coupling 81 with the pressure chamber 82 within a diaphragm valve casing 83. The chamber 82 is formed between the casing wall and one face of a transverse flexible diaphragm member 84 forming between the other face of the casing and said diaphragm a piston chamber 85 within which is mounted a piston 86, the stem 87 of which operates through an opening in a plate of insulating material 88 secured to the casing 83 closing the chamber 85, said plate on its upper surface carrying the respective binding posts 89 and 90. A lever 91 connected at one end to a member 92 extends transversely over the plate 88 and receives the upper end of the stem 87, the same being connected thereto by a pin 93. The free end of the lever is guided by a stem 94, and is normally pressed downwardly against the action of the pressure within chamber 82 by a spring 95 coiled about the member 94, and the tension of which is regulated by a nut 96. A suitable spring contact 97 secured at one end to the binding post 89 is adapted through points 98 to make and break a contact between post 89 and post 90. The member 97 carries an adjustable screw contact member 99 which is adapted on the upward movement of the stem 87 to be engaged by the upper end of the stem, and dependent on the adjustment of the screw 99 and tension of spring 95 to make or break connection between the points 98 in accordance with the difference of pressure in the line 27.

To break the circuit hereinafter described on the movement of the core 59 to the end of its stroke, as illustrated in Figures 2 and 10 of the drawings to permit the spring 67 to move the core longitudinally in an opposite direction within its bore, I provide in the circuit a pair of posts or terminals 100 and 101, and connect the same by a spring contact finger 102 secured at one end to the post 100, and adapted to connect with the post 101 by the making of contact points 103. The finger 102 is provided with an offset angle member 104 for receiving a nonconducting antifriction roller 105 carried by a crank 106, extending laterally from a rotatable rod 107. The rod 107 is fulcrumed at its ends in the bed 4 and plate 108, and is disposed adjacent to the rod 65, as in Figure 4. Extending laterally from the rod 107 within the path of movement of the lever 64 is a finger 109 adapted to be engaged by the lever 64.

It will be observed that but a slight movement of the rod 107 and crank 106 is required to operate the contact 102 to separate the points 103, and this movement is accomplished by the engagement of the lever 64 with the member 109. On the breaking of contact between the points 103, it will be observed that the core 59 is at the end of its stroke, in dotted lines Figure 2 of the drawings, and at this time the de-energizing of the solenoid 60 enables the spring 67 to move the core from dotted to full line position, Figure 2, but this movement would not be accomplished if the rod 107 and crank 106 were permitted to immediately be restored to a position enabling the making of contact points 103, and for this purpose I provide a lockout cam 110 mounted on a rod 111 rotatably mounted in parallel relation with the rod 107. The cam is positioned with its flat face 112 in slight spaced relation with the arcuate end 113 of a plate 114 extending laterally in the rod 107. A coiled spring 115 associated with the rod 111 exerts a pressure on said rod to rotate the same in the direction of the arrow, Figure 9, to cause the edge of said flat face 112 to normally impinge against the arcuate end of the plate 114, and at the same time permit the plate to swing in the direction of the arrow, Figure 9, when the action of the lever 64 operates the crank 106 to separate contact points 103. This impinging action precludes the return of the rod 107 and the crank 106 to its normal position until such time as the lever 64 has been moved by the action of the spring 67 to the end of its stroke in an opposite direction from that illustrated in Figure 4, at which time the lever will contact with the finger 116 extending from the rod 111, and will rotate said rod until the cam is in the position illustrated in Figure 8, at which time the tension of the contact 102 will operate the same to cause a making of contact between the points 103.

With the binding post 90 and post 100 connect respectively the wires 117 and 118 supplied with power from a suitable source, illustrated at 119 and from the post 101 extends the wire 120 connecting with the solenoid 60, and from the opposite end of said armature coil extends a wire 121 connecting through the wire 121' with the post 89, and from said wire 121' extends a wire 122' connecting with the post 122 of a temperature controlled thermostat 123 illustrated as being of the laminated type, and from the stationary contact of said thermostat extends a wire 125 connected with the post wire 117.

It will be apparent that by connecting the thermostat in multiple with the pressure controlled make and break within the power circuit that the pressure to the burner 7 is controlled primarily by the room temperature acting on the thermostat 123.

During such time as the room temperature is low and the thermostat 123 is closed, a continued operation of the electromagnetic motor is caused, as the motor circuit is closed, and this operation of the pump builds up the pressure within the member 83 to increase the flame in the burner 7. This pressure within the member 83 may rise sufficiently to break contacts in the circuit at 98, but as long as the room temperature is low and the thermostat is closed, the operation of the motor and pump continues.

On the room temperature attaining a given degree, the thermostat opens and the operation of the motor and pump is controlled solely by a variation of pressure in the member 83, and thus is intermittently operated, as during this time the completion of the motor circuit is controlled solely by the making and breaking of the circuit at points 98.

By my present arrangement of thermostat and switch within the power circuit, I am enabled to maintain a relatively even room temperature at all times thereby insuring the burning of a minimum quantity of fuel in accordance with the temperature desired.

Having thus described my invention, what I claim as new and desire to secure by Letters Patent of the United States is:—

1. An apparatus of the character described comprising an electric circuit, a burner, a fuel supply, a pump connected to the fuel supply for supplying fuel to the burner, an electromagnetic motor within the circuit and connected to the pump, a temperature controlled thermostat in the circuit, a pressure regulated switch in the circuit, means for continually operating the electro magnetic motor while the thermostat is in closed position, and means for controlling the electro magnetic motor through the pressure regulated switch while the thermostat is in open position.

2. An apparatus of the character described comprising a base, a bed yieldably supported on the base, a burner, a fuel supply, a pump carried by the bed and connected to the fuel supply for supplying fuel to the burner, and means connected to the bed for operating the pump.

3. An apparatus of the character described comprising a base, a bed yieldably supported on the base, a burner, a fuel supply, a pump carried by the bed and connected to the fuel supply for supplying fuel to the burner, an electromagnetic motor carried by the bed, and means connecting the electromagnetic motor and pump whereby the pump is operated upon operation of the motor.

4. An apparatus of the character described comprising a burner, a fuel supply, a pump connected to the fuel supply for supplying fuel to the burner under pressure, means for causing the continual operation of the pump until a predetermined temperature is reached, and means for controlling the operation of the pump by pressure of the fuel supply after the said predetermined temperature has been reached.

5. An apparatus for the described purpose including an electric circuit, a liquid discharge pipe, a liquid supply therefor, a pump connected therewith for supplying liquid to the pipe under pressure, an electromagnetic motor within said circuit and connected with said pump and including a reciprocating element, a contact device within said circuit for breaking said circuit on the reciprocation of the element in one direction, and for making the circuit on the reciprocation of the element in an opposite direction, means for reciprocating said element in one direction on the breaking of said circuit, and means for locking the contact device in open position to maintain said contact broken until the completion of the reciprocation of said element by said means.

6. An apparatus for the described purpose including an electric circuit, a burner, a liquid hydrocarbon fuel supply therefor, a pump connected therewith for supplying fuel to the burner under pressure, an electromagnetic motor within said circuit and connected with said pump and including a reciprocating element, a spring contact device within said circuit for breaking said circuit on the reciprocation of the element in one direction and for making the circuit on the reciprocation of the element in an opposite direction, means for reciprocating said element in one direction on the breaking of said circuit, means for locking said contact device in open position to maintain said contact broken until the completion of the reciprocation of said element by said means, and a device for releasing said contact lock on the completion of the reciprocation.

7. An apparatus for the described purpose including an electric circuit, a burner, a liquid hydrocarbon fuel supply therefor, a supply pipe connecting the supply with the burner, a pump within said pipe for forcing fuel therethrough under pressure to the burner, an electromagnetic motor within said circuit and connected with the pump for operating the same, said motor including a reciprocating element, an interrupter in said circuit operated by said motor element for the breaking of the circuit on the movement of said element in one direction, means for moving said element in an opposite direction when said circuit is broken, and a thermostat within said circuit.

8. An apparatus for the described purpose including an electric circuit, a burner, a liquid hydrocarbon fuel supply therefor, a supply pipe connecting the supply with the burner, a pump within said pipe for forcing fuel therethrough under pressure to the burner, an electromagnetic motor within said circuit and connected with the pump for operating the same, said motor including a reciprocating element, an interrupter in said circuit operated by said motor element for the breaking of the circuit on the movement of said element in one direction, means for moving said element in an opposite direction when said circuit is broken, a thermostat within said circuit, a movable member within said supply pipe and operated by the pump pressure therein, yielding means for holding said movable member against said pump pressure, a movable contact in said circuit in multiple with said thermostat, and actuated by the operation of said movable member due to a variation of pressure within said pipe for making and breaking said circuit independently of said thermostat.

In testimony whereof I have signed my name to this specification.

GEORGE N. BLANCHARD.